United States Patent [19]

Di Maria et al.

[11] Patent Number: 4,662,719
[45] Date of Patent: May 5, 1987

[54] LIQUID CRYSTAL DISPLAY AND METHOD FOR PRODUCTION

[75] Inventors: Donelli J. Di Maria, Ossining, N.Y.; Hans P. Wolf, Zurich, Switzerland

[73] Assignee: International Business Machines Corporation, Armonk, N.Y.

[21] Appl. No.: 649,092

[22] Filed: Sep. 10, 1984

[51] Int. Cl.⁴ ............................................. G01F 1/33
[52] U.S. Cl. .................................... 350/332; 350/334
[58] Field of Search ............... 350/332, 333, 334, 342; 340/789, 805, 784; 445/24

[56] References Cited

U.S. PATENT DOCUMENTS

| | | | |
|---|---|---|---|
| 3,824,003 | 7/1974 | Koda et al. | 350/160 LC |
| 3,936,676 | 2/1976 | Fujita | 350/332 |
| 4,193,669 | 3/1980 | Richardson | 350/334 |
| 4,239,346 | 12/1980 | Lloyd | 350/334 |
| 4,404,555 | 9/1983 | Long et al. | 340/784 |
| 4,413,883 | 11/1983 | Baraff et al. | 350/334 |
| 4,427,266 | 1/1984 | Hosokawa | 350/333 |
| 4,431,271 | 2/1984 | Okubo | 350/334 |
| 4,486,767 | 12/1984 | Fraleux et al. | 350/334 |

FOREIGN PATENT DOCUMENTS 0070598 1/1983 European Pat. Off. ............ 340/784

OTHER PUBLICATIONS

DiMaria et al, "High Current Injection into SiO₂ Films and Experimental Applications", J. Appl. Phys. 51(5), May 1980, pp. 2722-2735.
DiMaria et al, "Charge Transport and Trapping Phenomena in Offstoichiometric Silicon Dioxide Films", J. Appl. Phys. 54(10), Oct. 1983, pp. 5801-5827.
Eiji Kaneko, "Liquid-Crystal Matrix Displays", Advances in Image Pickup and Display, vol. 4, Academic Press 1981, pp. 1-86.

Primary Examiner—Arthur G. Evans
Attorney, Agent, or Firm—Carl C. Kling

[57] ABSTRACT

A matrix addressable liquid crystal display includes a thin film circuit supported on a substrate having a plurality of parallel bit lines. A plurality of individual pixel circuits each include a two terminal bi-directional gate device which is formed from at least one thin film layer with one gate device terminal connected with the associated bit line. A terminal plate is connected in circuit with the other terminal of the gate device. A transparent cover plate is spaced above the thin film circuit with a transparent conductor structure on the underside of the cover plate.

The space beneath the cover plate is filled with a liquid crystal display material to form individual display pixel circuits at the terminal plates. A plurality of parallel word lines are arranged orthogonally to, and insulated from, the bit lines. The word lines are connected in circuit with the individual display pixel circuits at the respective cross-overs with the bit lines.

The pixel circuits are each operable to change the state of the associated portion of the liquid crystal display material in response to the concurrent application of voltage pulses of opposite polarities to the associated word and bit lines.

18 Claims, 8 Drawing Figures

FIG. 5

FIG. 8
VOLTAGE CURVES

LIQUID CRYSTAL DISPLAY AND METHOD FOR PRODUCTION

TECHNICAL FIELD

This invention relates to liquid crystal display devices which are capable of receiving electrical signals and converting those signals to visible displays. The invention is particularly useful where graphic information is to be displayed by means of fine grained individual picture elements, commonly referred to as "pixels".

BACKGROUND OF THE INVENTION

At the present time, cathode ray tubes are the most frequently used electronic display devices for applications such as computers and television picture displays. Cathode rays tubes have been very satisfactorily developed for these purposes. However, they continue to have serious disadvantages, including shortcomings in the clarity and definition of the displayed information, lack of flatness in the display screen, bulkiness and heavy weight, and relatively high cost and high energy consumption.

It has been long recognized that if liquid crystal display devices could be developed to serve for these purposes, a number of the disadvantages enumerated above could be overcome. Many attempts have been made to provide large high definition liquid crystal displays. A number of these methods and the resulting structures are described in some detail in a chapter entitled "Liquid Crystal Matrix Displays" by Eiji Kameko in a book entitled "Image Pickup and Display" edited by B. Kazan and published by Academic Press in New York, N.Y. in 1981.

As explained in the above-mentioned reference, it is difficult to build matrix addressed liquid crystal displays with high capacity and high resolution because of the dynamic properties of liquid crystal materials. The individual cells of such a matrix forming individual pixels have to be written sequentially. The more pixels the array has, the less write time per pixel is allowed. To switch the liquid crystal material from one orientation to another in these short times requires a high voltage, which, however, disturbs non-addressed pixels. Accordingly, it is difficult to achieve precise voltage control on all of the pixels in a large display without providing other associated non-linear devices to operate as gating devices in connection with the matrix. Prior proposals for solution of this problem have included the addition of a suitable non-linear element to each liquid crystal display pixel of an array. Various non-linear elements have been proposed including transistors, diodes, and varistors.

One important prior approach has been to use thin film transistors. See U.S. Pat. No. 3,824,003 Koda et al. and U.S. Pat. No. 4,239,346 Lloyd. However, the physical size of such a display is substantially limited because, in order to obtain an adequate yield, with reproducability, and reliability, it is necessary to produce the transistor array on a single crystal of silicon. Large single crystal wafers are currently not available, and would be very expensive if they were available.

Another disadvantage with the transistors is that most of the presently known liquid crystal display materials should be subjected to frequent voltage reversals in order to prolong the life of the material, and the transistor matrices become much more complex if capable of operating in this fashion.

Another promising approach has been to use varistors, which are based upon a thick ceramic plate of a zinc oxide mixture. However, the operating voltage required is rather high, being on the order of 60 volts, and large plates are difficult to reproduce accurately, grain size is relatively large, and cycling behavior is questionable.

Another problem with liquid crystal display matrix structures has been that the display must frequently be renewed. Liquid crystal display pixel cells are essentially small capacitors which will hold a charge, and a display state, if the associated driving circuit does not have the characteristic of rapidly dissipating that charge. Prior matrix structures have often permitted a too-rapid charge dissipation.

Accordingly, it is one object of the present invention to provide an improved liquid crystal display matrix structure in which display refresh information need not be supplied with great frequency because the driving circuits for the display pixel cells do not readily permit the charge of the cells to leak off.

Another object of the invention is to provide an improved liquid crystal display structure which is characterized by a sharp switching operation from one display node to another.

Another object of the invention is to provide an improved liquid crystal display structure which is adapted for the production of very large displays having many pixels and high graphic definition.

Another object of the invention is to provide an improved liquid crystal display structure which is capable of reliable low voltage operation.

Another object of the invention is to provide an improved liquid crystal display structure which is characterized by relatively low cost.

Further objects and advantages of the invention will be apparent from the following description and the accompanying drawings.

SUMMARY OF THE INVENTION

In carrying out the invention there is provided a matrix addressable liquid crystal display comprising an insulating substrate, a thin film circuit supported on said substrate including a plurality of bit lines generally arranged in parallel thereon, a plurality of individual pixel circuits each comprising a two terminal bi-directional gate device formed from at least one thin film layer with one terminal of each gate device comprising at least a part of one surface of said gate device connected in circuit with the associated bit line and with the other terminal comprising the other surface of said gate device, a terminal plate connected in circuit with said other terminal of said gate device, a transparent cover plate spaced above said thin film circuit, a substantially transparent conductor structure positioned and arranged on the underside of said cover plate, the space beneath said cover plate and above said terminal plate being filled with a liquid crystal display material to form a part of each of said individual pixel circuits of said terminal plates, a plurality of parallel word lines arranged orthogonally to, and insulated from, said bit lines, said word lines being connected in circuit with said individual display pixel circuits at the respective cross-overs with said bit lines, said pixel circuits each being operable to change the state of the associated portion of said liquid crystal display material in response to the concurrent application of voltage pulses of opposite polarities to the associated word and bit lines.

DETAILED DESCRIPTION OF THE PREFERRED EMBODIMENTS OF THE INVENTION

Figures 1, 2, 3, 4:
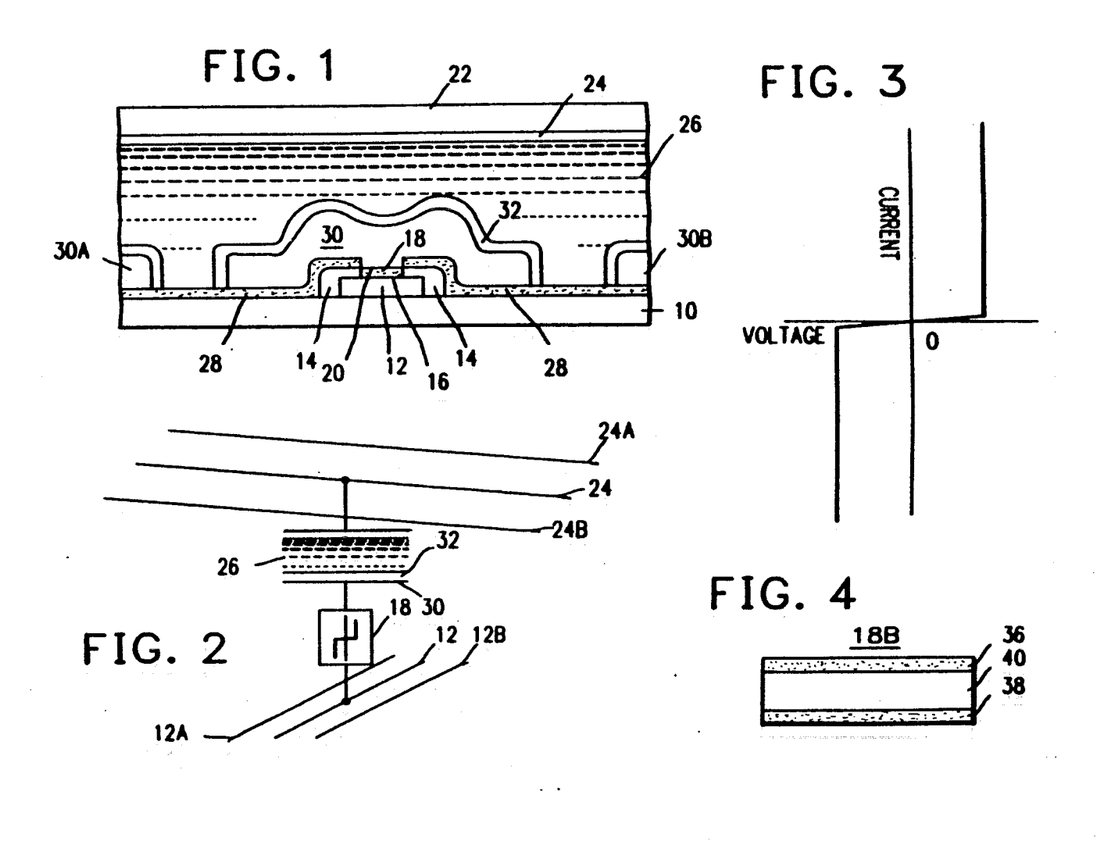
FIG. 1 is a greatly enlarged and idealized sectional side view of a single pixel cell portion of the matrix display structure in accordance with one preferred embodiment of the present invention.
FIG. 2 is an idealized equivalent circuit of the pixel cell of FIG. 1.
FIG. 3 is an idealized representation of the voltage-current characteristic of the gating device of FIG. 1.
FIG. 4 is an enlarged representation illustrating an alternative structure for a gating device to be included in the pixel cell of FIG. 1.

Referring more particularly to FIG. 1, there is shown an enlarged detailed cross-sectional partial view of a matrix addressable liquid crystal display structure in accordance with one embodiment of the present invention. The structure includes an insulating substrate member 10, which may consist of glass, with an conductive bit line 12 deposited thereon. Bit line 12 may be composed of polycrystalline silicon. Bit line 12 may be one of many bit lines arranged in parallel and substantially perpendicular to the plane of the drawing. The bit line 12 may be composed of various materials, but a preferred material, by way of example, is polycrystalline silicon.

Almost completely surrounding the bit line 12 on the substrate 10 is a layer of insulating material 14, which may be composed for instance of silicon dioxide. In the insulating material 14, there is arranged a window opening 16 which extends through the insulation material 14 to the conductive material of the bit line 12. A number of window openings are arranged over each bit line in a pattern, with one window being provided for each pixel of the liquid crystal display. Within each window opening, there is a two-terminal bi-directional gate device formed from at least one thin film layer, as indicated at 18. The bottom boundary of the gate device 18, which is in contact with the bit line 12, constitutes one terminal of the gate device, and the top surface of the gate device 18, indicated at 20, forms the other terminal of the gate device.

The structure also includes a transparent cover plate 22 spaced above the circuit elements thus far described. The cover plate 22 may be composed of glass. On the under side of the cover plate 22 there is a substantially transparent word line conductor 24. A plurality of these conductors are preferably provided which are arranged in parallel mutually spaced relationship. The word line conductors 24 may be composed of a material such as a deposited film of indium oxide. The remaining space within the device is filled with a suitable liquid crystal display material 26, which may be of the twisted nematic type, or of the guest-host type.

The thin film layer gate device 18 is preferably laid down by chemical vapor deposition, and is most economically accomplished by placing a layer over the entire substrate 10, including the area of the windows 16 and the surrounding area. The excess layer, outside the windows 16, is indicated at 28. The excess layer is not effective in modifying the gate function of the gate device 18 or in providing any auxiliary gate function, since the excess material 28 is not in contact with any conductor such as the bit line 12, being insulated therefrom by the insulator 14.

Over the gate device 18, there is preferably provided a conductive plate material element 30 which is in contact with the upper surface 20 of the gate device 18, and really becomes the upper conductive terminal of the gate device 18. Preferably this conductive upper terminal may again be polycrystalline silicon, and is sometimes referred to hereinafter as an upper terminal plate. The polycrystalline silicon plate 30 is preferably surrounded by an insulating dielectric layer 32 preferably consisting of silicon dioxide. The silicon dioxide shields the polycrystalline silicon plate 30 from any chemical reaction with the LCD material. The insulating dielectric plate 32 and the LCD material 26 are both dielectrics, and together form the dielectric medium of what is electrically a capacitor cell in the circuit for the individual pixel as illustrated in FIG. 1.

The upper terminal conductive plates 30 for adjacent cells are substantially insulated from one another. The plates for the adjacent cells are indicated at 30A and 30B. Thus, the individual pixel cells are individually addressable by combinations of signals on the associated bit lines 12 and word lines 24.

FIG. 2 is a schematic circuit diagram of the individual cell illustrated in FIG. 1 showing the bit line 12 at the bottom, the word line 24 at the top, the two terminal bidirectional gate device 18, and the capacitor cell consisting of the dielectric insulator layer 32 and the LCD material 26 between the plate 30 and the word line 24. As shown in FIG. 2, the circuit essentially consists of the gating device 18 and the capacitive cell including the LCD material 26 connected in series between the bit line 12 and the word line 24. Adjacent bit lines 12A and 12B, and adjacent word lines 24A and 24B are shown to indicate the presence of a matrix.

FIG. 3 illustrates the switching characteristic of the gate device 18, in somewhat idealized form, where current is shown by the oridinate, and voltage by the abscissa. In order to achieve this characteristic, the gate device 18 may be formed from a single layer of silicon-rich silicon dioxide. Such a material will provide a conduction characteristic such as illustrated in FIG. 3, where a voltage across the gate device of either polarity, and of sufficient magnitude, will cause substantially unlimited current conduction. The switching voltage level is determined partly by the amount of excess silicon in the layer, and partly by the thickness of the layer. A typical threshold switching voltage for such a gating device may be on the order of 5 to 25 volts.

A very substantial advantage of a gating device of this type, having the characteristic shown in FIG. 3, is that the strap threshold between a substantially non-conductive state and a substantially conductive state for the device means that precise switching is available, even for a large matrix, in which it is difficult to have precise voltage regulation for all matrix pixel cells. Another very substantial advantage is that after the switching voltage has been removed, the impedance of the gating device for discharge of the liquid crystal cell capacitor is quite high so that the charge decays very slowly, and the charge on the cell need not be refreshed as often as it would be in another structure.

Another important advantage is that the LCD capacitor can be charged very quickly because of the sharp switching characteristic of the gating device.

Furthermore, in order to get long liquid crystal material life, it is highly advisable to change the polarity of the voltage across the LCD capacitor rather frequently. Preferably, this voltage is changed every time the charge on the cell is refreshed. Since the two terminal gating device 18 is bidirectional in its operation, this is easily accomplished by simply reversing the polarities of the voltages.

Still another important advantage of the invention is that because of the sharp switching characteristic of the gating device, the LCD capacitor charges or discharges to change state very quickly.

FIG. 4 illustrates an alternative embodiment 18B of the gating device 18 which preferably consists of two silicon-rich silicon dioxide layers 36 and 38 separated by a silicon dioxide layer 40. While the layers are illustrated in FIG. 4 in an idealized form, separated from supporting structures, it will be understood that the layers are intended to be laid down as thin film layers within the window 16 of FIG. 1. These three layers form a dual electron injection structure. The two outer layers 36 and 38 serve as injectors. The resultant conduction mechanism, Fowler-Nordeheim Tunneling, provides a conduction curve essentially the same as that shown in FIG. 3. In such a structure, the voltage at which substantial conduction occurs is approximately proportional to the oxide thickness.

In an actual physical embodiment of the device, the individual pixel cells may be made very small, down to a size where the individual pixel display signals are not very meaningful alone, but combine to provide a display of high resolution. For instance, the space occupied by individual pixels may be as small as ten micrometers or less. In such a structure, the individual windows 16 may be on the order of five micrometers in diameter, or less.

With a density of ten micrometers per cell (1,000 pixels per centimeter) a very fine graphical resolution is available which is approximately 200 times better than that provided by high quality photo offset photographically reproduced "half-tone" printed pictures, and which dramatically exceeds the graphical capability of typical cathode ray tubes.

Referring back again to FIG. 2, if the voltage applied across the pixel cell between bit conductor 12 and word conductor 24 exceeds the threshold voltage of the gate device 18, then the capacitor formed by the LCD material 26 and the dielectric 32 is charged to a voltage value corresponding to the applied voltage less the threshold voltage of the gate device 18. If that voltage is above the threshold of the LCD material, then the LCD material changes state, with a resultant change in the visual effect. After the external voltage is removed, the capacitor remains charged, and the visual effect remains unchanged, but the charge decays slowly because of the finite conductance of the LCD material. Because of this, the cell must be refreshed periodically. In order to provide for long liquid crystal display material life, it is preferred to change the polarity of the refresh voltage on each refresh cycle. The rise and fall times of the LCD material should be on the order of ten milliseconds, and the conductivity such that dielectric relaxation time is at least equal to, or longer than, this.

The advantage of the cell of this invention, compared with a cell which does not include a gating device such as 18, is that the capacitor can be charged very quickly due to the strong non-linearity of the gating device, and that the capacitor then holds the charge because the gating device effective impedance goes up dramatically upon the removal of the input voltage to slow the discharge of the capacitor. Therefore, despite a short duty cycle, which is necessary in a large array, the cell sees a high root mean square voltage.

The matrix of the invention may be operated in a number of different ways. For instance, as one example, the matrix way be operated in a word oriented fashion as follows: The word lines 24 are periodically scanned with a voltage which is close to the threshold voltage of the gate device 18. If no voltages are applied to the bit lines, then this discharges the capacitors. This is true because the word voltages are reversed after each scan. If certain bits along a word line are to be displayed, or changed in state, then on the corresponding bit lines 12 a voltage is applied opposite in polarity to the word line voltage but simultaneously with the word voltage. The cell is then charged to the bit voltage. The bit voltage must be higher than the threshold of the LCD material, but so low that it does not disturb other non-addressed cells along the bit line. An optimum choice is believed to be that the threshold voltage of the gate device 18 must be about four times the threshold volage of the LCD material. That approximate ratio is preferred in the practice of this invention. The word line voltage is then made equal to the threshold voltage of the gate device, and the bit line voltage is given half that value. Due to their extremely small sizes, the capacitances of the gate device and the bit line with respect to the individual pixel cells can be kept small, so that cross-talk is negligable.

In accordance with this invention, it is possible to build very large LCD arrays of more than 20,000 by 20,000 pixels. Because of the features of this invention, and the use of known vapor deposition techniques and established silicon film processing technology, the limitation on the size of the array is no longer the LCD material, but is due to the processing yield. Since ample space is available, it is possible to increase processing yield by providing redundancy in the form of double bit lines, or double word lines.

In this entire disclosure, the lines 12 have been referred to as bit lines, and the lines 24 as word lines. However, it will be understood that this is simply an arbitrary designation, and that in the design of the matrix drive system, the lines 12 may be employed as word lines, and the lines 24 as bit lines instead.

With the structures as disclosed, and using silicon technology for the gating device, a practical switching voltage range for the gate device 18 is from about 5 volts to about 25 volts. For a single layer gate device, employing silicon-rich silicon dioxide, a 5 volt threshold voltage is achieved with a film thickness of about 500 angstroms with an excess of 5% to 6% of silicon. If the amount of excess silicon is reduced, the switching voltage goes up. If the amount of excess silicon remains constant, the switching voltage increases essentially in proportion to the increase in film thickness.

With the three layer gate structure 18B illustrated in FIG. 4, with an excess of silicon in the silicon-rich layers 36 and 38 of appoximately 13%, a 5 volt switching voltage is achievable when the intermediate layer 40 has a thickness of about 100 angstroms. In this structure, the thickness of the middle layer is the critical thickness in determining the switching voltage. The switching voltage again will increase with increased film thickness, and will also increase with any reduction in the amount of excess silicon.

As previously mentioned above, a spacing as small as ten micrometers is easily achievable for the pixels of the matrix system constructed in accordance with the present invention. This corresponds to a density of as many as one million pixels within one square centimeter of display array. This permits the production of extremely small, fine grained pictorial or graphic displays, if desired. However, for larger displays, such fine grained resolution is not always required, and leads to tremendous memory requirements in the "frame buffer" (the logic circuits which drive the matrix array). However, there is no engineering reason why the technology of the present invention cannot be used with such fine grain definition for a display as large as a typical cathode ray tube or television picture tube. Accordingly, the only real limitation is in the logical storage capacity of the matrix driving circuits.

Up to this point, the invention has been described essentially in terms of silicon technology, employing polycrystalline silicon and silicon-rich silicon dioxide vapor deposited layers. That technology is preferred in carrying out this invention because it is highly developed, and is economical, and leads to excellent results.

However, other materials may be used in carrying out the invention. For instance, the bit lines 12 may be composed of conductors other than doped polycrystalline silicon. Various metals may be vapor deposited upon the substrate to form the bit lines. Furthermore, the thin film layer gating device 18 may be composed of materials other than silicon-rich silicon dioxide. Accordingly, this device may be described more generically as consisting of a thin film layer of a large band gap insulating material with microscopic agglomerated islands of a material therein which is at least a semiconductor. With silicon-rich silicon dioxide, the islands are formed of silicon. However, the layer may consist of silicon nitride with an excess of silicon. Another alternative is a film of aluminum oxide, with the islands of material which is at least a semiconductor consisting essentially of aluminum. In films of these various compositions, the agglomerated islands of a material which is at least a semiconductor may be selected from the group consisting of gold, nickel, tungsten, titanium, tantalum and copper, as well as silicon and aluminum.

Similarly, the alternative gating device structure 18B shown in FIG. 4 may employ other materials, such as silicon nitride, instead of silicon dioxide.

In the preferred method of fabrication of the matrix structure of the present invention, referring to FIG. 1, a thin film of doped polycrystalline silicone is laid down on the glass substrate 10, and then the desired pattern of substantially parallel bit lines 12 is created from the film by lithography and etching. The thin film is then oxidized to provide the insulating cover 14 for the bit lines. Portions of the oxidized layer 14 are then selectively removed to form the windows 16 in the desired pattern over the bit lines 12. The thin film layer of silicon-rich silicon dioxide is then laid down by chemical vapor deposition to form the gating device 18 and the excess layer 28. The polycrystalline silicon plates 30, 30A, and 30B, are then laid down by chemical vapor deposition, and the pattern of those plates is determined by removing excess material between the individual plates by lithography and etching. The plates are then oxidized to form the silicon dioxide layer 32.

The word line conductors 24 are vapor deposited upon the glass cover plate 22, and the cover plate is then assembled with the substrate 10 and filled with LCD material and sealed. A suitable spacer gasket is provided around the edges, and between the edges, of this cover plate 22 and substrate 10.

It should be emphasized that an important feature of the gate device 18 of FIG. 1, or the alternative gate device structure 18B of FIG. 4, is that the device is bidirectional, by which is meant that, within a single device, the gating operation is essentially symmetrical no matter which polarity of voltage gradient is applied across the device, as illustrated in FIG. 3. Thus, the device differs from a unidirectional device such as a zener diode, or a transistor. It is a simple two terminal device, which further distinguishes it from a transistor, and being formed of one or more thin vapor deposited films, it is extremely simple and economical to fabricate.

FIGS. 5, 6, 7, and 8 illustrate an alternative embodiment of the invention in which the word lines are formed on the substrate, rather than being a part of the transparent conductive structure attached to the underside of the coverplate. Also, an additional capacitor is added to the circuit. These changes are all accomplished primarily by simply rearranging the patterns and structures of the layers formed on the substrate, and by making the transparent conductive structure on the underside of the coverplate a single monolithic conductor, rather than parallel word lines. No additional layers are required in fabrication. In FIGS. 5-8, the components generally corresponding to those in FIGS. 1 and 2 are similarly designated, but with added letter suffixes.

Figure 5:
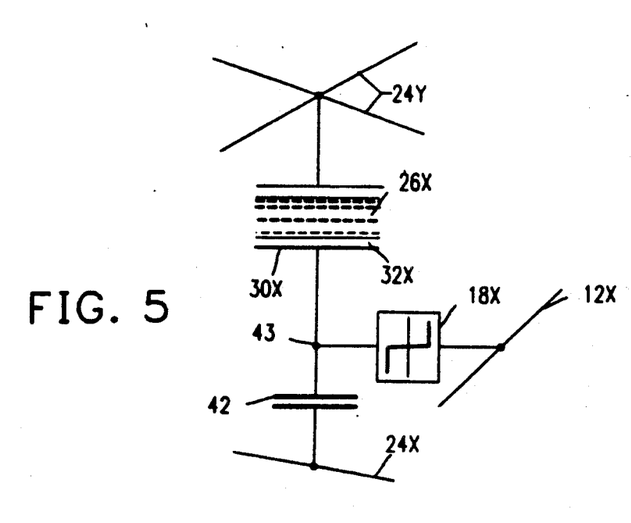
FIG. 5 is an idealized equivalent circuit corresponding to FIG. 2, but illustrating an alternative embodiment of the invention.

As illustrated in the idealized equivalent of FIG. 5, the transparent conductive structure 24Y, becomes a monolithic conductive structure, rather than forming the word lines. Instead, word lines are provided on the substrate, as indicated at 24X. A capacitor 42 is added in the circuit and connected between the word line 24X and the junction between the plate 30X and the gating device 18X. Plate 30X and gating device 18X correspond respectively to plate 30 and gate 18 of the embodiment of FIGS. 1 and 2.

Figure 6:
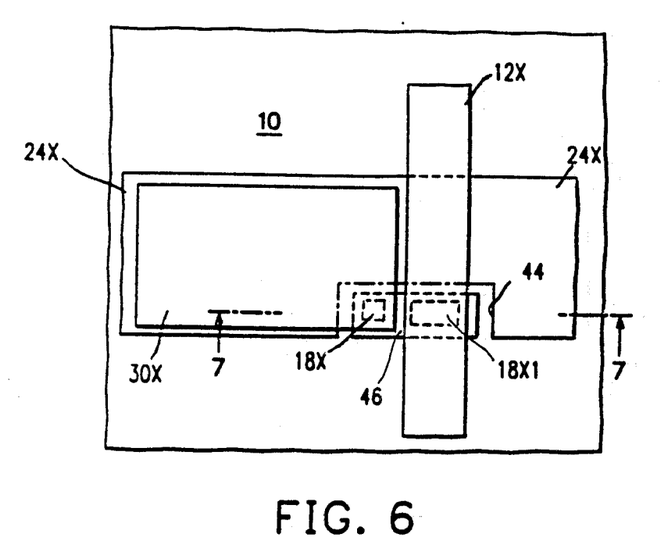
FIG. 6 is a top view illustrating a preferred physical structure for the embodiment of FIG. 5.
Figure 7:
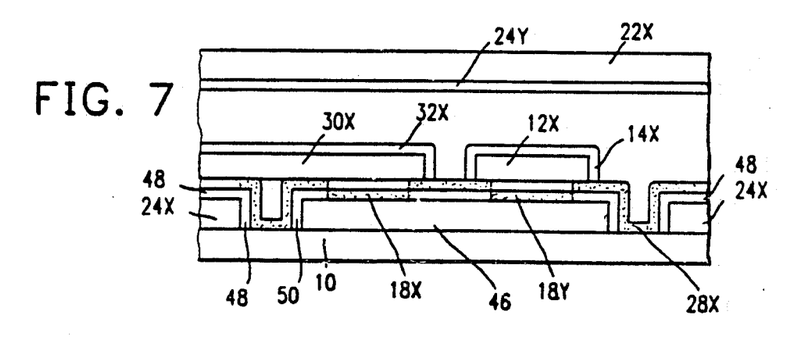
FIG. 7 is a sectional side view corresponding to FIG. 1, but showing the embodiment of FIG. 5 and FIG. 6.

The preferred structure of the embodiment of FIG. 5 is illustrated in FIGS. 6 and 7. FIG. 6 is a top view of the substrate and the substrate layers with the upper plate and the conductive structure 24Y removed. FIG. 7 is a sectional view taken at section 7—7 in FIG. 6 and including the transparent plate 22X and the conductive structure 24Y.

Referring again to FIG. 6, the word line 24X (and its parallel counterpart word lines, not shown) is laid down as the bottom layer element on the substrate 10. However, there is a cutout portion of word line 24X at 44. Within that cutout portion, there is an interconnection island 46, which is positioned beneath the bit line 12X and beneath the plate 30X. The plate 30X extends over a substantial area of the word line 24X, and forms the capacitor 42 between the plate 30X and the word line 24X. The island 46 contains two gate devices 18X and 18X1 through which the island 46 interconnects to the bit line 12X and the capacitor plate 30X. The device 18X, as illustrated in FIG. 5, includes the series-connected devices 18X and 18X1 of FIG. 6. The combination of 18X and 18X1 is sometimes referred to herein as a single device. As in the structure of FIG. 1, the plate 30X also serves as one of the plates of the capacitor 26X formed with the liquid crystal display material as a dielectric.

For a better understanding of the structure of the invention, reference is made to the sectional view of FIG. 7. FIG. 7 corresponds very closely to FIG. 1, and is drawn to the same scale, although neither is true to scale. FIG. 7 shows the word line 24X extending on both sides of the island connector 46. In this embodiment, the gate devices 18X and 18X1 are formed in windows in the insulation surrounding the interconnection island 46, rather than in the bit line 12X, as in the embodiment of FIG. 1. The nature of the respective layers is exactly the same as it was in the embodiment of FIG. 1. Thus, the lowermost layer, including the word line 24X and the interconnection island 46, is composed of a conductive material. These elements are each surrounded with insulation, as indicated at 48 and 50, which may be conveniently formed of silicon dioxide when the conductors 24X and 46 are formed of polycrystalline silicon. As in the embodiment of FIGS. 1 and 2, windows are formed in the insulation layer 50 for the gate devices 18X and 18X1. The next layer, or layers, is the thin film layer gate device material, which extends into the windows to form the gate devices 18X and 18X1, and extends harmlessly across the insulation layers 48 and 50 as indicated at 28X.

As in the embodiment of FIG. 1, the next layer of conductive material forms the conductive plate 30X, but in this embodiment, this layer also forms the bit line 12X. This layer also may be composed of polycrystalline silicon. The plate 30X and the bit line 12X are then covered with insulating material 32X and 14X, which again may be silicon dioxide.

Since the plate 30X, as shown in FIG. 6, extends over a substantial area of the word line 24X, between which there is the dielectric insulation 48, a capacitor 42 of substantial size is formed.

The gate device material forms the two gate devices 18X and 18X1 which are connected in series with one another. While this structure is a little more complicated than the single gate device 18 described in connection with FIG. 1, the operation of the series connected devices is essentially the same as the single device 18 of FIG. 1, and as described in conjunction with FIG. 3.

Figure 8:
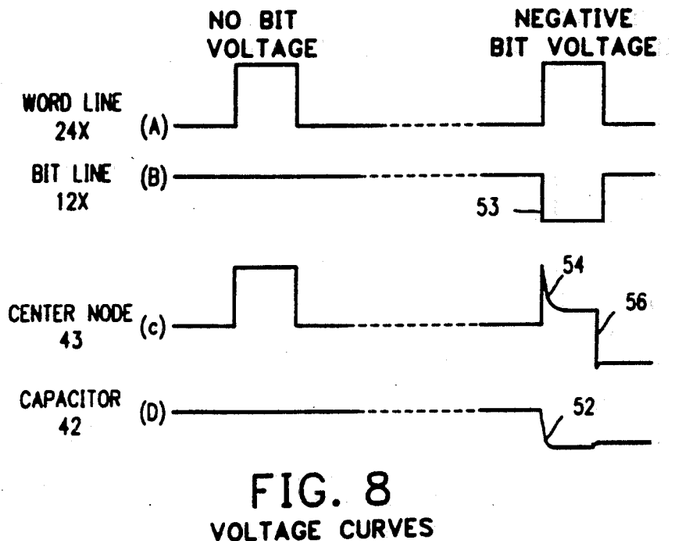
FIG. 8 is a timing diagram showing typical idealized voltage relationship within the embodiment of FIG. 5 to illustrate the operation of that embodiment.

The operation of the embodiment of FIGS. 5, 6, and 7 may be described with specific reference to FIG. 5 and FIG. 8.

FIG. 8 is an idealized time pulse diagram which illustrates typical pulses and typical voltages within the circuit of FIG. 5 during operation. In FIG. 8, curve A illustrates positive going pulses on word line 24X. Curve B illustrates, in the first instance, no voltage on the bit line 12X, and then a negative bit voltage on that line. Curve C represents the resulting voltages at the center node 43 of FIG. 5 resulting from the voltages of curves A and B, and curve D represents the charge on capacitor 42 resulting from the voltages in curves A and B.

Word line voltage pulses, such as illustrated in curve A, are regularly applied to the word line 24X. However, these voltage pulses are not sufficient to trigger conduction in the switching device 18X, in the absence of a pulse of opposite polarity on the bit line 12X. Accordingly, as illustrated at the first timing interval for a word line pulse in FIG. 8, when there is no bit line pulse, the center node 43 voltage (curve C) is changed only during the interval of the word line pulse, and the capacitor 42 charge (curve D) is not changed at all. While the word line voltage pulse would be sufficient in amplitude to switch the liquid crystal, because the time between word line pulses is much longer than the duration of a word line pulse, the average voltage on node 43 is small, and below the threshold of the liquid crystal material, and thus the liquid crystal pixel is not switched. Also, the switching time of the liquid crystal pixel is longer than the duration of the word line pulse, but shorter than the time between word line pulses, so that the word line pulse does not endure long enough to switch the pixel.

However, if a voltage pulse of opposite polarity is applied to the bit line 12X, as indicated at the second pulse interval in FIG. 8 curve B at 53, the gating device 18X switching voltage is exceeded, causing that device to become conductive, and causing the capacitor 42 to become charged to a total voltage value substantially corresponding to the full difference between the values of the two voltage pulses, less the switching voltage of the switching device 18X. The resultant voltage across the capacitor terminals is illustrated at the second time interval in curve D at 52 in FIG. 8. The resultant center node 43 voltage is illustrated at the second timing interval in curve C of FIG. 8.

The switching just described occurs because the bottom plate of capacitor 42 is connected to the word line 24X directly, and the top plate of the capacitor 42 is connected essentially to the bit line 12X because the switching device 18X is conductive. Because the opposite polarities are connected to the opposite plates of capacitor 42, the capacitor changes charge quickly as indicated at 52 in curve D, resulting in the change in voltage of the center node 43 as indicated at 54 in curve C. At this point, the voltage at center node 43 is insufficient to trigger the LCD pixel 26X to a different visual state.

However, when the pulses both end, the gating device 18X switches off, and the word line 24X returns to its original value (referred to for convenience herein as ground potential) from its prior positive potential. The resultant negative going change in the potential of the lower plate of capacitor 42 causes an additional negative excursion of the node 43, as indicated at 56 in curve (C). Since the upper conductive plate 24Y is maintained constantly at the intermediate (ground potential) value, upon the achievement of the enhanced negative voltage at the center node 43, the threshold of the liquid crystal material of the capacitor 26X is exceeded, and the voltage is maintained for an interval longer than the switching interval of the LCD material. Therefore, the material changes its visual state, and part of the charge on capacitor 42 is transferred to the smaller "capacitor" 26X. The combination of the capacitor 26X and 42, connected in series, then maintain charge (and the switched state of the LCD) for an extended period, making it unnecessary to refresh the display signals for a considerable interval.

As compared to the embodiments of FIGS. 1 and 2, longer intervals are permitted between refresh operations in the embodiments of FIGS. 5–7 because of the additional storage provided by capacitor 42.

When it is time to "erase" the pixel, changing it back to the uncharged state, that can be accomplished by means of a word line pulse alone, in the absence of a bit line pulse, when the word line pulse is of polarity opposite to the pulse which was used to establish the charge on capacitor 42.

The circuit operates to accomplish this purpose in the following manner: assuming a negative charge on capacitor 42 resulting from the prior combination of a positive word line pulse and a negative bit line pulse, when the word line 24X receives a negative pulse, that voltage pulse is additive to the negative charge on capacitor 42, causing a negative potential across the switching device 18X which exceeds the switching voltage of that device (the bit line 12X being held at ground potential). The resultant conduction of switching device 18X cause the flow of current which drains off the negative charge on capacitor 42, so that by the time of the termination of the negative word line pulse, the capacitor 42 is substantially discharged, and the node 43 is returned to a substantially zero potential. This resets the LCD pixel.

The embodiments of FIGS. 5, 6, and 7 have the same advantages as the embodiments of FIG. 1 in permitting operation on reversed polarities. Thus, the explanation just given by reference to a negative going pulse on bit line 12X and a positive going pulse on word line 24X is also applicable for reversed polarities of both pulses. As in the embodiment of FIG. 1, it is preferable to reverse the polarities frequently in order to enhance the life of the liquid crystal display material.

While the above discussion is based upon voltages related to a "ground" potential, it will be understood that it is the relative voltage values which are important, and those values may be varied in relation to a potential other than "ground".

Referring back again to FIG. 6, the island 46 is illustrated as arranged in a cut out portion 44 at the edge of the word line 24X. However, it wll be understood that this construction may be carried out in other ways. For instance, the island 46 may be arranged beside the word line 24X, without being arranged in a cut out portion 44, or the cut out portion 44 and the island 46 may be positioned along the center line of the word line 24X, with continuous portions of the word line 24X extending on both sides of the cut out portion 44 and the island 46.

Various conventional liquid crystal display materials may be employed in this invention. The invention generally contemplates a reflective type of liquid crystal display using ambient light. However, the films are all very thin, and the structure may be constructed so as to permit transmission of light through the entire structure, and so as to permit the use of light transmissive liquid crystal display materials. For some variations in such structures, polarizer layers must be added. For reflective types of liquid crystal displays, at least one of the substrate layers may be especially constructed to provide a high reflectivity.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

Having thus described our invention, what we claim as new, and desire to secure by Letters Patent is:

1. A matrix addressable liquid crystal display comprising an insulating substrate, a thin film circuit supported on said substrate including a plurality of bit lines generally arranged in parallel thereon, a plurality of individual pixel circuits each comprising a two terminal bi-directional gate device formed from at least one thin film layer with one terminal of each gate device comprising at least a part of one surface of said gate device connected in circuit with the associated bit line and with the other terminal comprising the other surface of said gate device, a terminal plate connected in circuit with said other terminal of said gate device, a transparent cover plate space above said thin film circuit, a substantially transparent conductor structure positioned and arranged on the underside of said cover plate, the space beneath said cover plate and above said terminal plate being filled with a liquid crystal display material to form a part of each of said individual pixel circuits at said terminal plates, a plurality of parallel word lines arranged orthogonally to, and insulated from, said bit lines, said word lines being connected in circuit with said individual display pixel circuits at the respective cross-overs with said bit lines, said pixel circuits each being operable to change the state of the associated portion of said liquid crystal display material in response to the concurrent application of voltage pulses of opposite polarities to the associated word and bit lines.

2. A combination as claimed in claim 1 wherein said word lines are formed as a part of said transparent conductor structure on the underside of said cover plate.

3. A combination as claimed in claim 1 wherein said word lines are formed as additional conductors on said substrate and wherein a thin film capacitor is provided between each of said terminal plates and the associated word line, and wherein said combination is operable while maintaining said transparent conductor structure at a potential intermediate to the values of said voltage pulses of opposite polarities.

4. A display as claimed in claim 1 wherein said two terminal bidirectional gate device is formed from at least one thin film layer of a large band gap insulating material with microscopic agglomerated islands of a material therein which is at least a semiconductor.

5. A display as claimed in claim 4 wherein said large band gap insulating material is selected from the group consisting of silicon dioxide, silicon nitride, and aluminum oxide, and wherein the material which is at least a semiconductor is selected from the group consisting of silicon, gold, copper, nickel, tungsten, titanium, tantalum and aluminum.

6. A display as claimed in claim 4 wherein said gate device film layer consists essentially of silicon dioxide with an excess of silicon forming said islands.

7. A display as claimed in claim 4 wherein said gate device film layer consists essentially of silicon nitride with an excess of silicon forming said islands.

8. A display as claimed in claim 4 wherein said thin film layer of said gate device consists essentially of aluminum oxide and wherein said islands of material which is at least a semiconductor consist essentially of aluminum.

9. A display as claimed in claim 4 wherein said bidirectional gate device is formed of two thin film layers, said thin film layers each consisting of a large band gap insulating material selected from the group consisting of silicon dioxide and silicon nitride with said islands of a material which is at least a semiconductor consisting of silicon, and said gate device further including a thin film layer of silicon dioxide positioned between said last-named thin film layers.

10. A matrix addressable liquid crystal display comprising an insulating substrate, a thin film circuit supported on said substrate including a plurality of bit lines generally arranged in parallel thereon, an insulation material arranged over said bit lines, individual window openings arranged in a pattern in said insulation material over said bit lines, a two terminal bi-directional gate device formed from at least one thin film layer in each of said windows with one terminal of each gate device comprising at least a part of the bottom area of said gate device in touch with the associated bit line and with the other terminal comprising at least a part of the top surface of said gate device and being exposed through said window, a transparent cover plate spaced above said thin film circuit, substantially transparent word line conductors positioned and arranged substantially in parallel on the underside of said cover plate and aligned at an angle to said bit lines and substantially in alignment with said windows, the space beneath said cover plate being filled with a liquid circuit display material to form individual display pixel circuits at said windows controllable by a combination of voltages on said bit lines and said word lines, each of said pixel circuits including the gate device formed in the associated window in series with the liquid crystal display material positioned between said exposed gate terminal of said gate device and an associated word line.

11. A display as claimed in claim 10 wherein said word line conductors are arranged substantially perpendicular to said bit lines, and wherein said bidirectional gate device includes an additional thin film layer of conductive material overlaying and in conductive relationship with said previously mentioned thin film layer and forming the top terminal plate of said gate device.

12. A display as claimed in claim 11 wherein said top terminal plate layer of said gate device is substantially larger than the area of said window and extends over said insulation material over the associated bit line, the top terminal plate layers for adjacent gate devices being insulated from one another.

13. A display as claimed in claim 12 wherein a layer of dielectric material is provided over said top terminal plate layer.

14. A display as claimed in claim 13 wherein said bit lines are comprised of polycrystalline silicon material, said insulation material arranged over said bit lines is comprised of silicon dioxide, said top terminal plate layer consists essentially of polycrystalline silicon, and said dielectric layer consists essentially of silicon dioxide.

15. A method of making a high density high resolution matrix addressable liquid crystal display comprising the steps of forming a thin film of a conductive material on a glass substrate, creating a pattern of parallel bit lines in said film, oxidizing said bit lines to provide an insulating cover for said lines, opening a pattern of small windows in the oxide insulation on said bit lines to form small windows to provide one such window for each desired liquid crystal display pixel cell, depositing at least one thin film layer of a material in said window which is effective to form a bidirectional gate device, depositing an upper conductive plate layer over said bidirectional gate device to form an upper terminal for said gate device, forming parallel word lines on the underside of a glass cover plate, assembling said glass cover plate over the remainder of the structure and in spaced relation thereto, and filling the remaining space beneath said cover plate with a liquid crystal display material.

16. A method as claimed in claim 15 wherein the thin film of a conductive material on the glass substrate consists essentially of a doped polycrystalline silicon, and wherein said thin film layer of material deposited in said window to form a bidirectional gate device consists essentially of a large band gap insulating material with microscopic agglomerated islands of a material therein which is at least a semiconductor.

17. A method as claimed in claim 16 wherein said large band gap insulating material is selected from the group consisting of silicon dioxide, silicon nitride, and aluminum oxide, and wherein the material which is at least a semiconductor is selected from the group consisting of silicon, aluminum, gold, copper, nickel, tungsten, titanium, tantalum and aluminum.

18. A method as claimed in claim 17 wherein said thin film of a conductive material on the glass substrate consists essentially of doped polycrystalline silicon, and wherein said thin film layer forming said bidirectional gate device consists essentially of a silicon-rich silicon dioxide so that the material which is at least a semiconductor consists essentially of silicon.

* * * * *